(12) United States Patent
Takada et al.

(10) Patent No.: US 6,270,925 B1
(45) Date of Patent: *Aug. 7, 2001

(54) LITHIUM BATTERY

(75) Inventors: Kazunori Takada; Shigeo Kondo, both of Osaka; Ryoji Kanno, Kobe; Tatsuya Nakamura, Hiroshima; Mikio Takano, Kyoto, all of (JP)

(73) Assignees: Toda Kogyo Corporation, Hiroshima-ken; Matsushita Electric Industrial Co., Ltd., Osaka-fu, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/916,331

(22) Filed: Aug. 22, 1997

(30) Foreign Application Priority Data

Aug. 23, 1996 (JP) .................................... 8-222727

(51) Int. Cl.$^7$ ...................................... H01M 4/02

(52) U.S. Cl. ...................... 429/231.1; 429/218.1

(58) Field of Search ................ 429/218.1, 221, 429/231.1

(56) References Cited

U.S. PATENT DOCUMENTS

| | | |
|---|---|---|
| 3,558,493 | 1/1971 | Wickham . |
| 3,609,084 | 9/1971 | Loye . |
| 4,464,447 | 8/1984 | Lazzari et al. . |

(List continued on next page.)

FOREIGN PATENT DOCUMENTS

| | | |
|---|---|---|
| 2 022 012 | 11/1970 | (DE) . |
| 0 243 926 | 11/1987 | (EP) . |
| 0 728 702 A1 | 8/1996 | (EP) . |
| 55-5767 | 1/1980 | (JP) . |
| 56-103869 | 8/1981 | (JP) . |
| 5-062679A | 3/1993 | (JP) . |
| 5-205743 | 8/1993 | (JP) . |
| 8-287914 | 1/1996 | (JP) . |
| 8-78004 | 3/1996 | (JP) . |
| 8-287914 | 3/1997 | (JP) . |

OTHER PUBLICATIONS

Chemical Abstracts vol. 120, No. 14 4/94 No. 168818 "Nonaqueous Electrolyte Lithium Secondary Batteries and Manufacture of Cathode Active Mass for them".

Chemical Abstracts, vol. 125, No. 4 7/96 No. 38096 "Secondary Lithium Batteries with Improved Cathodes".

Kanno et al J. Electrochem. Soc., vol. 143, No. 8, Aug. 1996 pp. 2435–2442 The Electrochemical Society, Inc. "Synthesis, Structure, and Electrochemical Properties of a New Lithium Iron Oxide etc.".

(List continued on next page.)

*Primary Examiner*—Carol Chaney
(74) *Attorney, Agent, or Firm*—Nixon & Vanderhye P.C.

(57) ABSTRACT

The present invention related to a lithium battery comprising a pair of electrodes disposed by means of a separator in the presence of a lithium ion conductive electrolyte, wherein at least one of said electrodes comprises a lithium iron oxide having a corrugated layer crystal structure and represented by the formula (1):

$$Li_x(Fe_{(1-y)}M_y)O_2 \qquad (1)$$

wherein M represents at least one element selected from the group consisting of cobalt, nickel, manganese and aluminum, x is more than 0 and less than 2, and y is 0.005 to 0.1, Which has improved battery characteristics, an excellent cycle life and a higher electric current operated.

5 Claims, 4 Drawing Sheets

U.S. PATENT DOCUMENTS

| | | |
|---|---|---|
| 4,770,960 | 9/1988 | Nagaura et al. . |
| 5,264,201 | 11/1993 | Dahn et al. . |
| 5,316,875 | 5/1994 | Murai et al. . |
| 5,342,711 | 8/1994 | Tamura et al. . |
| 5,358,805 | 10/1994 | Fujimoto et al. . |
| 5,503,930 | 4/1996 | Maruyama et al. . |
| 5,789,110 | 8/1998 | Saidi et al. . |
| 5,824,434 * | 10/1998 | Kawakami et al. ............... 429/209 |

OTHER PUBLICATIONS

Fernandez–Rodriguez: J. Materials Science vol. 23, 1988 pp. 2971–2974 "Synthesis and alteration of alpha–LiFeO$_2$" etc. (No Month).

Sakurai et al Low Temperature Synthesis and Electrochemical Characteristics of LiFeO$_2$ Cathodes J. Power Sources 69 (1997) 711–715 (No Month).

Kanno et al J. Electrochem. Soc. vol. 143 No. 8 8/96 Synthesis, Structure, and Electrochemical Properties etc.

Kanno et al J. of Power Sources 68 (1997) 145–152 Synthesis and electrochemical properties of lithium iron oxides with layer–related structures (No Month).

Thackeray et al J Electrochem. Soc., vol. 139, No. 2 2/91 pp363–366 Spinek Electrodes from the Li–Mn–O System for Rechargeable Lithium Battery Applications.

* cited by examiner

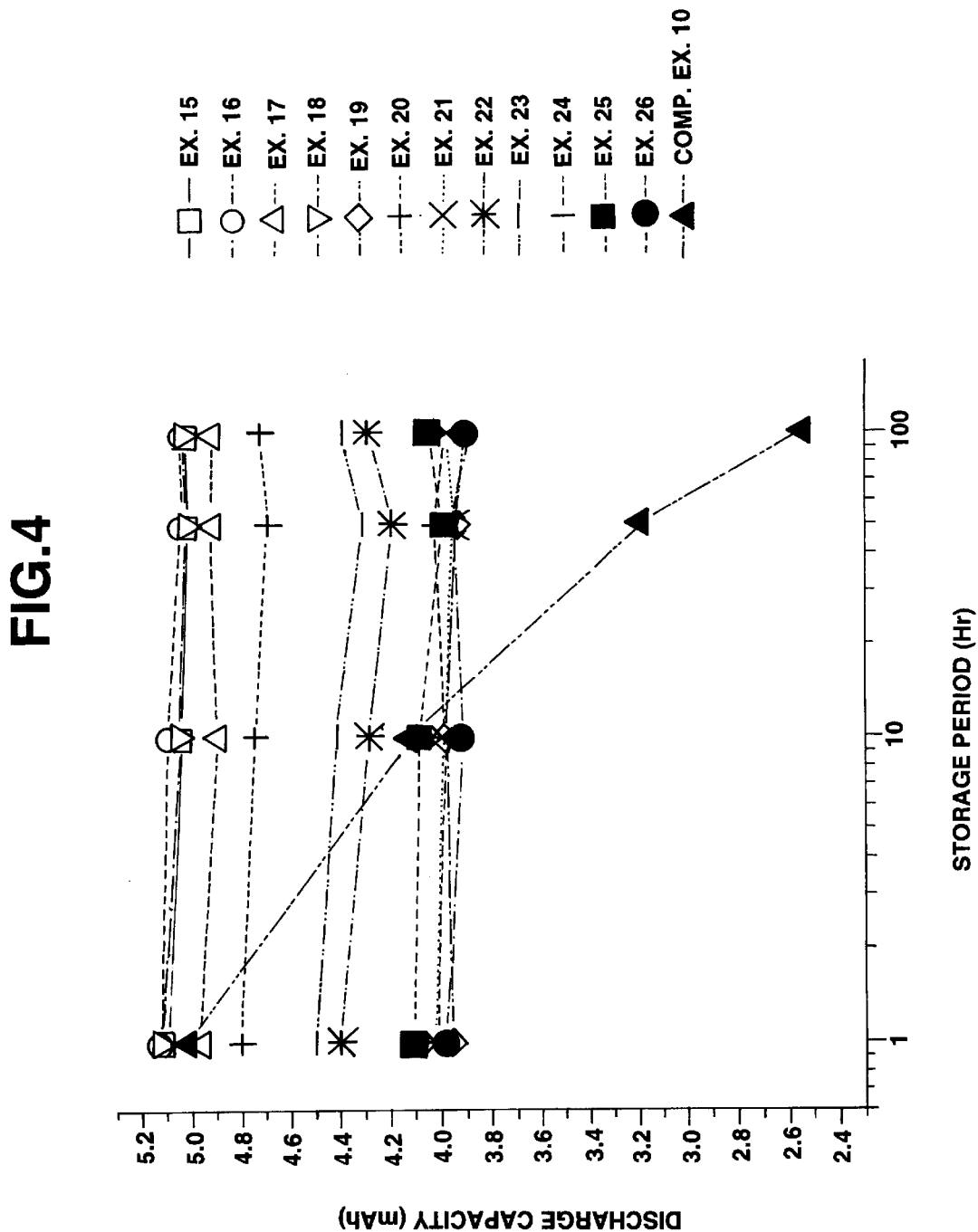

LITHIUM BATTERY

BACKGROUND OF THE INVENTION

The present invention relates to a lithium battery, and more particularly, to a lithium battery using a lithium iron oxide as an electrode active material.

With the recent development of portable electrical equipments such as personal computers and handy phones, there is an increasing demand for batteries as the power source. Especially, a lithium battery using lithium which has a small atomic weight but a large ionization energy, produces a high energy density, and various studies have been made on lithium batteries.

As a cathode active material which produces a high electromotive force and increases the energy density in a battery, those producing a voltage of 4 V such as $Li_xCoO_2$ and $Li_xNiO_2$ are extensively investigated.

However, since a battery using a compound containing cobalt or nickel such as $Li_xCoO_2$ and $Li_xNiO_2$ costs too much, and the production of both cobalt and nickel is comparatively low, these compounds cannot be said to be optimal as a material of a battery for practical use. It is, therefore, expected to solve this problem by using an iron compound obtained by replacing Co and Ni in $Li_xCoO_2$ or $Li_xNiO_2$, respectively, with another transition metal element, in particular Fe, which is cheap and which is found in abundance.

$Li_xCoO_2$ and $Li_xNiO_2$ which have excellent properties as an electrode active material have a layered rock salt-type ($\alpha$-$NaFeO_2$) crystal structure. As a compound having a stratified layered rock salt-type crystal structure other than $Li_xCoO_2$ and $Li_xNiO_2$, $Li_xVO_2$ and $Li_xCrO_2$ are only known, and no lithium iron oxide having a similar crystal structure is known.

A lithium iron oxide obtained by, what is called a high-temperature synthesizing process, by calcining mixed particles of an iron oxide and a lithium compound at about 800° C., has a disordered tetragonal rock salt-type crystal structure. On the other hand, a lithium iron oxide obtained by, what is called a low-temperature synthesizing process, by calcining mixed particles of an iron oxide and a lithium compound at about 400 to 500° C., has an ordered tetragonal rock salt-type crystal structure. However no lithium battery produced by using such a lithium iron oxide as an electrode active material had a sufficient performance for practical use.

To solve the above-mentioned problems, a lithium battery using a lithium iron oxide: $Li_xFeO_2$ (0<x<2) having a corrugated layer structure similar to the crystal structure of the known $Li_xMnO_2$ (0<x<2) was proposed.

The lithium iron oxide: $Li_xFeO_2$ (0<x<2) having a corrugated layer structure is obtained by the ion-exchange reaction between protons in lepidocrocite ($\gamma$-FeOOH) and lithium ions. Since lepidocrocite has a crystal structure containing protons between the corrugated layers, in the case where lepidocrocite is heated together with a lithium compound, an ion exchange reaction occurs, and simultaneously with the removal of the protons, lithium ions are introduced between the corrugated layers, so that a lithium iron oxide having a corrugated layer structure is obtained. When a lithium battery is produced by using such a lithium iron oxide as an electrode active material, the lithium ions between the $FeO_2$ layers are electrochemically introduced into and removed from the lithium ion cites between the layers during the operation of the battery.

This lithium battery, however, has the following problems. It is necessary to carry out the ion-exchange reaction at a temperature as low as not higher than 350° C., because when the ion-exchange reaction is carried out at a high temperature, $\alpha$-$LiFeO_2$ as a high-temperature stable phase is produced. Since the ion-exchange reaction is carried out at such a low temperature, the crystallinity of the lithium compound obtained is low, and the crystal structure tends to become unstable.

When lithium ions are repetitively electrochemically introduced into and removed from the ion cites of the lithium iron oxide having such an unstable crystal structure along with the charge and discharge of the battery, the crystal structures around the iron cites are likely to change, and as a result, the ion cites where the lithium ions can exist or the lithium ion conduction path in the crystals tends to disappear. Consequently, with the repetition of charge and discharge of the battery, a reduction in the capacity of the battery or an increase in the internal impedance tends to be caused.

The lithium iron oxide having a corrugated layer structure have a low electron conductivity and the diffusion of the lithium ions between the layers is slow. As a result, in a lithium battery using the lithium iron oxide, the electrode reaction rate is low and the electric current operated by the battery become small.

In addition, the crystal structure of the lithium iron oxide changes with the passage of time and lepidocrocite is apt to be produced. The change in the crystal structure lowers the activity as the electrode active material, and a reduction in the capacity of the battery or an increase in the internal impedance is apt to be caused, so that it is difficult to keep the characteristics of the lithium battery stable.

As a result of studies undertaken by the present inventors so as to solve these problems, it has been found that a lithium battery (lithium cell) using a lithium iron oxide containing a specific amount of at least one element selected from the group consisting of cobalt, nickel, manganese and aluminum, and having a corrugated layer crystal structure as an electrode active material for at least either of the electrodes, preferably a cathode active material, has an excellent cycle life, a large current drain operated and has stable characteristics of the battery. The present invention has been achieved on the basis of this finding.

SUMMARY OF THE INVENTION

It is an object of the present invention to provide a lithium battery having improved characteristics of the battery by improving a lithium iron oxide used therefor.

It is another object of the present invention to provide a lithium battery having an excellent cycle life.

It is still another object of the present invention to provide a lithium battery having a higher electric current operated.

It is even another object of the present invention to stabilize the characteristics of a lithium battery.

To accomplish the aim, in a first aspect of the present invention there is provided a lithium battery comprising a pair of electrodes disposed by means of a separator in the presence of a lithium ion conductive electrolyte, wherein at least one of said electrodes comprises a lithium iron oxide having a corrugated layer crystal structure and represented by the formula (1):

$$Li_x(Fe_{(1-y)}M_y)O_2 \tag{1}$$

wherein M represents at least one element selected from the group consisting of cobalt, nickel, manganese and aluminum, x is more than 0 and less than 2, and y is 0.005 to 0.1.

In a second aspect of the present invention, there is provided a lithium battery comprising a pair of electrodes disposed by means of a separator in the presence of a lithium ion conductive electrolyte, wherein at least one of said electrodes comprises a lithium iron oxide having a corrugated layer crystal structure and represented by the formula (2):

$$Li_x(Fe_{(1-y)}Al_y)O_2 \qquad (2)$$

wherein x is more than 0 and less than 2, and y is 0.005 to 0.1.

In a third aspect of the present invention, there is provided a lithium battery comprising a pair of electrodes disposed by means of a separator in the presence of a lithium ion conductive electrolyte, wherein at least one of said electrodes comprises a lithium iron oxide having a corrugated layer crystal structure and represented by the formula (1):

$$Li_x(Fe_{(1-y)}M_y)O_2 \qquad (1)$$

wherein M represents at least one element selected from the group consisting of cobalt, nickel, manganese and aluminum, x is more than 0 and less than 2, and y is 0.005 to 0.1, and produced by heating a mixture of lepidocrocite containing at least one element selected from the group consisting of cobalt, nickel, manganese and aluminum and a lithium compound at a temperature of 100 to 150° C.

In a fourth aspect of the present invention, there is provided a lithium battery comprising a pair of electrodes disposed by means of a separator in the presence of a lithium ion conductive electrolyte, wherein at least one of said electrodes comprises a lithium iron oxide having a corrugated layer crystal structure and represented by the formula (1):

$$Li_x(Fe_{(1-y)}M_y)O_2 \qquad (1)$$

wherein M represents at least one element selected from the group consisting of cobalt, nickel, manganese and aluminum, x is more than 0 and less than 2, and y is 0.005 to 0.1, and produced by heating a mixture of lepidocrocite containing at least one element selected from the group consisting of cobalt, nickel, manganese and aluminum and a lithium compound at a temperature of 100 to 150° C., and after washing the reaction product with water, filtering off and drying, heat-treating the obtained product at 100 to 250° C.

In a fifth aspect of the present invention, there is provided a lithium battery comprising a pair of electrodes disposed by means of a separator in the presence of a lithium ion conductive electrolyte, wherein at least one of said electrodes comprises a lithium iron oxide having a corrugated layer crystal structure and produced by heating a mixture of lepidocrocite and a lithium compound at a temperature of 100 to 150° C., and after washing the reaction product with water, filtering off and drying, heat-treating the obtained product at 100 to 250° C.

BRIEF DESCRIPTION OF THE DRAWINGS

FIG. 4 shows the relationship between the storage period of iron oxides and the discharge capacity of lithium batteries using the iron oxides in Examples and Comparative Examples of the present invention.

DESCRIPTION OF THE PREFERRED EMBODIMENTS

Figure 1:
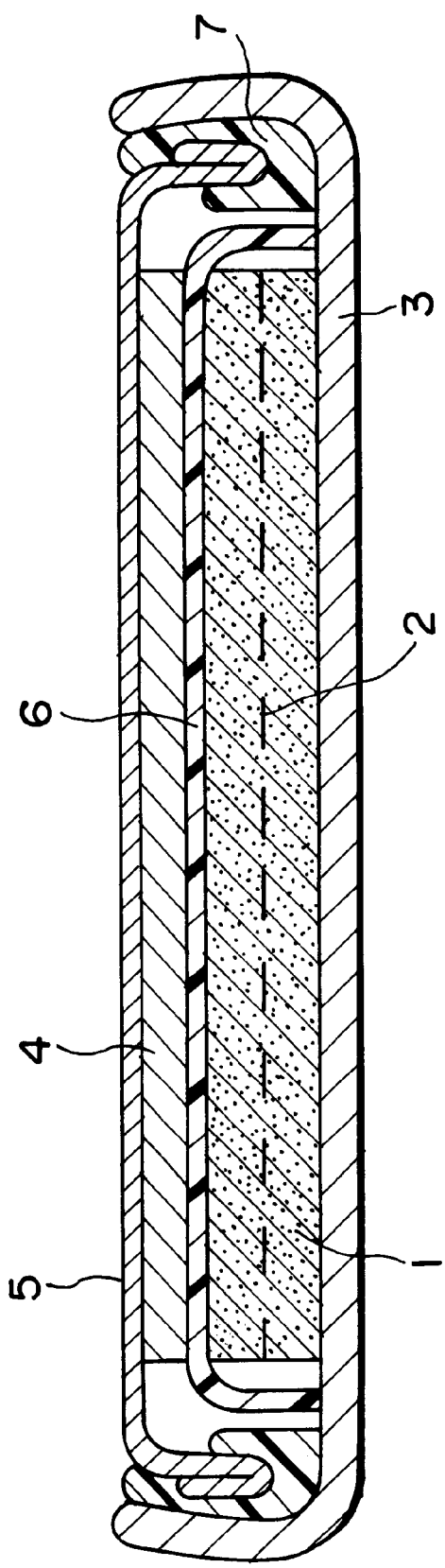
FIG. 1 is a vertical cross-sectional view of an embodiment of a lithium battery according to the present invention.

A lithium battery according to the present invention comprises a pair of electrodes disposed by means of a separator in the presence of a lithium ion conductive electrolyte and, for example, has a structure shown in FIG. 1.

In FIG. 1, a cathode 1 and an anode 4 are disposed in a case 3 so as to be opposed to each other with a separator 6 composed of a porous thermoplastic resin film. A lithium ion conductive electrolyte is present in the case 3.

In the lithium battery of the present invention, it is only necessary that the above-described specific lithium iron oxide is used as an active material for at least one electrode, preferably a cathode active material, and the other active materials may be the known substances which are conventionally used for a lithium battery.

For example, when the lithium iron oxide is used as the cathode active material, metal lithium, indium-lithium alloy, lithium-aluminum alloy, graphite, etc. are usable as the anode active material.

When the lithium iron oxide is used as the anode active material, $LiCoO_2$, $LiNiO_2$, $LiMn_2O_4$, etc. are usable as the cathode active material.

Examples of the lithium ion conductive electrolyte are a liquid obtained by dissolving lithium perchlorate in a mixed solvent of propylene carbonate and dimethoxyethane; a sulfide-based lithium ion conductive amorphous solid electrolyte represented by $0.6Li_2S$—$0.4SiS_2$; an electrolyte containing $LiPF_6$ as a supporting electrolyte; an electrolyte containing ethylene carbonate as the solvent, and solid electrolytes such as $Li_3PO_4$—$Li_2S$—$SiS_2$, $LiI$—$Li_2S$—$B_2S_3$, $Li_2S$—$P_2S_5$, $LiI$—$Al_2O_3$, etc.

In the present invention, a lithium iron oxide represented by $Li_x(Fe_{(1-y)}Al_y)O_2$ (0<x≦2, 0.005≦y≦0.1), which contains 0.5 to 10.0 mol % of aluminum and which has a corrugated layer structure is used as the active material for at least one electrode.

Alternatively, a lithium iron oxide represented by $Li_{x'}(Fe_{(1-y)}M_y)O_2$ (0<x'≦1, 0.005≦y≦0.1 and M represents at least one element selected from the group consisting of aluminum, cobalt, manganese and nickel), which contains 0.5 to 10.0 mol % of at least one element selected from the group consisting of cobalt, nickel and manganese, and which has a corrugated layer structure is used as the active material for at least one electrode.

The above-mentioned lithium iron oxides used in the present invention is produced by heating a mixture of lepidocrocite containing at least one element selected from the group consisting of cobalt, nickel, manganese and aluminum, and a lithium compound at a temperature of 100 to 150° C., and if necessary, after washing the reaction product with water, filtering off and drying, heat-treating the obtained product at 100 to 250° C.

As the lepidocrocite, those which are generally represented by $\gamma$-$(Fe_{(1-A)}M_A)OOH$ (0<A≦0.1, and M represents at least one element selected from the group consisting of aluminum, cobalt, manganese and nickel) are usable in the present invention.

In a lithium battery in another aspect of the present invention, an lithium iron oxide produced by heating a mixture of lepidocrocite and a lithium compound at a temperature of 100 to 150° C., and after washing the reaction product with water, filtering off and drying, heat-treating the obtained product at 100 to 250° C., is used as an active material for at least one electrode.

When the aluminum-containing lithium iron oxide is used as the lithium iron oxide for a lithium battery, the battery produced therefrom is excellent especially in the cycle life for the following reason.

It is possible to produce the aluminum-containing lithium iron oxide by the ion-exchange reaction between lepidocrocite containing aluminum and a lithium compound. In the ion-exchange reaction between lepidocrocite and a lithium compound, when lepidocrocite containing aluminum is used as the lepidocrocite, a lithium iron oxide represented by $Li_{x'}(Fe_{(1-y)}Al_y)O_2$ ($0<x'\leq1$, $0.005\leq y \leq 0.1$), which has a corrugated layer structure and which has a higher crystallinity is obtained.

When the lithium iron oxide having a higher crystallinity obtained in this manner is used as the electrode active material, it is possible to produce a lithium battery in which the crystal structure of the lithium iron oxide is unlikely to change even at the time of insertion and removal of lithium ions into and from the ion sites of the lithium iron oxide during the action of the battery, and which has the battery characteristics of which are stable in the repetition of charge and discharge and an excellent cycle life.

The reason why the aluminum-containing lithium iron oxide having a high crystallinity is obtained when lepidocrocite containing aluminum is used, is not clear, but it is considered that the aluminum contained in lepidocrocite contributes to the crystallinity of the lithium iron oxide obtained from the fact that when lepidocrocite containing no aluminum is used as an iron material, the lithium iron oxide obtained has a low crystallinity.

In the X-ray diffraction diagrams of the aluminum-containing lithium iron oxide: $Li_{x'}(Fe_{(1-y)}Al_y)O_2$ ($0<x'\leq1$, $0.005\leq y \leq 0.1$) which is obtained by using lepidocrocite particles in which a part of iron in $\gamma$-FeO(OH) is replaced by aluminum and known lithium iron oxide: $Li_xFeO_2$ which is obtained by using lepidocrocite particles in which iron in $\gamma$-FeO(OH) not replaced by aluminum, the peak width of the diffraction line of the aluminum-containing lithium iron oxide is narrower than that of the lithium iron oxide. This phenomenon means that the crystallinity of the aluminum-containing lithium iron oxide is improved by using the lepidocrocite containing aluminum.

In the lithium battery of the present invention, it is preferable to use the aluminum-containing lithium iron oxide: $Li_{x'}(Fe_{(1-y)}Al_y)O_2$ ($0<x'\leq1$, $0.005\leq y \leq 0.10$), which contains 0.5 to 10.0 mol % of aluminum (calculated as Al) based on the total amount of iron and aluminum from the following reason.

The reaction of $Li_xFeO_2$ as an electrode is caused by the injection and emission of electrons into and from iron ions as well as the insertion and extraction of lithium ions between the crystal layers. For this reason, in case where aluminum is contained in $Li_xFeO_2$, the content of iron ions into and from which electrons are injected and emitted is reduced, and when it is used as an electrode active material of a lithium battery, the capacity of the battery becomes small. However, when the aluminum content is less than 0.5 mol %, it is impossible to obtain a lithium iron oxide having a high crystallinity, and the capacity of the battery produced therefrom is lowered due to a change in the crystal structure of the lithium iron oxide. Therefore, a lithium battery using the aluminum-containing lithium iron oxide manifests excellent battery characteristics.

Even if the aluminum content exceeds 10.0 mol %, it is possible to produce a lithium battery having an excellent cycle life. However, the capacity of the battery lowers, as described above. In addition, when more than 10.0 mol % of aluminum is added in the later-described production of lepidocrocite, goethite is mixed with lepidocrocite, and it is difficult to produce only lepidocrocite containing aluminum. As a result, an impurity phase is included in the electrode of the lithium battery using the lithium iron oxide obtained.

When a lithium iron oxide containing at least one element selected from the group consisting of cobalt, nickel and manganese used as the lithium iron oxide for a lithium battery, it is possible to produce a lithium battery having a large operation current from the following reason.

Such a lithium iron oxide can be produced by heating a mixture of lepidocrocite containing at least one element selected from the group consisting of cobalt, nickel and manganese, and a lithium compound so as to cause an ion-exchange reaction between the lithium ions and the protons between the layers of lepidocrocite: $\gamma$-$(Fe_{(1-y)}M^1_y)$O(OH) ($0.005\leq y \leq 0.1$, $M^1$ is Co, Ni, Mn or the mixture thereof) having a corrugated layer structure.

The reason why the current operated by the lithium battery is enhanced by using this lithium iron oxide is not clear, but it is guessed as follows.

A lithium iron oxide is a conductive for a mixture of electrons and lithium ions. The electrons are conducted while hopping between iron ions, and lithium ions are conducted to the ion cites between the $FeO_2$ layers. When the electrons are introduced into and removed from iron ions with the movement of electrons, the energy level of the lithium ion cites in the vicinity thereof changes and the probability of lithium ions occupying the ion cites changes. As a result, it is considered that electrons and lithium ions are conducted in the crystals as if they were coupling with each other.

When a part of iron in the lithium iron oxide is replaced with at least one element selected from the group consisting of cobalt, nickel and manganese, the electron structure in the vicinity of the Fermi level changes and the number of electrons thermally excited to the conduction band electron zone is considered to increase. As a result, the number of electrons hopping between iron ions increases, and the lithium ions between the layers are also conducted with the conduction of the electrons, so that the conductivity of lithium ions is considered to be enhanced. The electron conductivity of the lithium iron oxide is also enhanced.

Since the electron conductivity and the lithium ion conductivity in the lithium iron oxide are enhanced, the reaction resistance of the electrode which uses the lithium iron oxide as an active material lowers. In this way, it is possible to produce a lithium battery having a high rate capability by using a lithium iron oxide containing at least one element selected from the group consisting of cobalt, nickel and manganese.

In the lithium battery of the present invention, it is preferable to use a lithium iron oxide: $Li_{x'}(Fe_{(1-y)}M^1_y)O_2$ ($M^1$ is at least one element selected from the group consisting of cobalt, nickel and manganese, $0<x'\leq 1.0$, $0.005\leq y \leq 0.10$), which contains 0.5 to 10.0 mol % of one element selected from the group consisting of cobalt, nickel and manganese. When $M^1$ is less than 0.5 mol %, the current operated by the lithium battery using the lithium iron oxide is not enhanced so much. When $M^1$ exceeds 10.0 mol %, spinel ferrite is mixed with lepidocrocite in the production of lepidocrocite, and it is difficult to produce only lepidocrocite containing at least one element selected from the group consisting of cobalt, nickel and manganese. As a result, an impurity phase due to the spinel ferrite is included in the electrode of the lithium battery using the lithium iron oxide obtained, so that there arises a problem such as a reduction in the capacity of the battery.

A lithium iron oxide having a corrugated layer structure is preferable as an electrode active material, preferably a cathode active material, of a lithium battery according to the present invention, and especially, the lithium iron oxide used in the present invention shows an excellent electrochemical reversible reaction.

The lithium iron oxide containing at least one element selected from the group consisting of aluminum, cobalt, nickel and manganese is obtained by the ion-exchange reaction between the lithium ions contained in a lithium compound and the protons between the layers of a corrugated layer structure of lepidocrocite. Therefore, the lithium iron oxide has a composition: $Li_{x'}(Fe_{(1-y)}M_y)O_2$ ($0<x'\leq 1$, $0.005 \leq y \leq 0.1$, M is Al, Co, Ni, Mn or the mixture thereof). In addition, since the insertion and removal of the lithium ions are repeated in a lithium ion conductive electrolyte, the lithium iron oxide has a composition: $Li_{x'}(Fe_{(1-y)}M_y)O_2$ ($0<x'\leq 2$, $0.005 \leq y \leq 0.1$, M is Al, Co, Ni, Mn or the mixture thereof).

The ion-exchange reaction between lepidocrocite: $\gamma$-$Fe_{(1-y)}M_yOOH$ ($0.005 \leq y \leq 0.1$, M is Al, Co, Ni, Mn or the mixture thereof) and lithium hydroxide is ideally represented by the following formula (I), and the composition of the lithium iron oxide obtained is represented by $Li_{x'}(Fe_{(1-y)}M_y)O_2$ ($x'=1.0$, $0.005 \leq y \leq 0.1$, M is Al, Co, Ni, Mn or the mixture thereof). However, this ion-exchange reaction does not end completely, and generally remains the reaction represented by the following formula (II). The lithium iron oxide obtained has a composition represented by $Li_{x'}(Fe_{(1-y)}M_y)O_2$ ($0<x'\leq 1$, $0.005 \leq y \leq 0.1$).

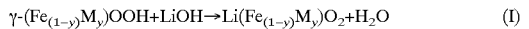
$$\gamma\text{-}(Fe_{(1-y)}M_y)OOH + LiOH \rightarrow Li(Fe_{(1-y)}M_y)O_2 + H_2O \quad (I)$$

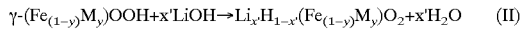
$$\gamma\text{-}(Fe_{(1-y)}M_y)OOH + x'LiOH \rightarrow Li_{x'}H_{1-x'}(Fe_{(1-y)}M_y)O_2 + x'H_2O \quad (II)$$

In contrast, since this lithium iron oxide causes the electrochemical insertion and removal reaction of lithium ions represented by the following formula (III) in a lithium battery in the presence of a lithium ion conductive electrolyte, the lithium iron oxide has a composition: $Li_x(Fe_{(1-y)}M_y)O_2$ ($0<x<2$, $0.005 \leq y \leq 0.1$) in a lithium battery.

(III)

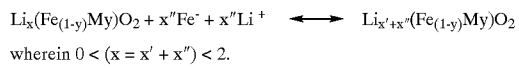
$$Li_x(Fe_{(1-y)}M_y)O_2 + x''Fe^- + x''Li^+ \longleftrightarrow Li_{x'+x''}(Fe_{(1-y)}M_y)O_2$$

wherein $0 < (x = x' + x'') < 2$.

The size of the lithium iron oxide in the present invention is approximately the same as the particle size of lepidocrocite as an iron material, and about 0.01 to 1.0 μm in average particle diameter.

The lepidocrocite containing at least one element selected from the group consisting of aluminum, cobalt, nickel and manganese in the present invention is represented by $\gamma$-$(Fe_{(1-y)}M_y)O(OH)$ ($0.005 \leq y \leq 0.1$, M is Al, Co, Ni, Mn or the mixture thereof), and contains iron and 0.5 to 10.0 mol % of at least one element selected from the group consisting of aluminum, cobalt, nickel and manganese (calculated as Al, Co, Ni and Mn) based on the total amount of iron and the selected element, and have an average particle diameter of usually 0.01 to 1.0 μm.

Such lepidocrocite is obtained by the known lepidocrocite production method in the presence of at least one element selected from the group consisting of aluminum, cobalt, nickel and manganese. The most representative lepidocrocite production method is a method of oxidizing iron by passing an oxygen-containing gas such as air into an acidic or neutral suspension containing ferrous hydroxide.

As the lithium compound, $Li_2O$, $LiOH$, $LiOH \cdot H_2O$, etc. are usable in the present invention. In order to suppress the production of $\alpha$-$LiFeO_2$ having a disordered structure and to produce only the target lithium iron oxide: $Li_{x'}(Fe_{(1-y)}M_y)O_2$ ($0<x'\leq 1.0$, $0.005 \leq y \leq 0.1$, M is Al, Co, Ni, Mn or the mixture thereof) anhydride of a lithium compound can be preferably used.

The mixing ratio (Li/Fe) of lepidocrocite and a lithium compound is usually not less than 1.2, preferably not less than 1.4 (in the molar ratio of lithium and iron). If the molar ratio of lithium and iron is less than 1.2, $\beta$-$Li_{x'}(Fe_{(1-y)}M_y)_5O_8$ ($0 \leq x' \leq 1$, $0 \leq y \leq 0.1$, M is Al, Co, Ni, Mn or the mixture thereof) having a disordered spinel structure is apt to be produced.

If the amount of lithium compound greatly exceeds the stoichiometric composition, an unreacted lithium compound such as lithium hydroxide remains as it is, and the lithium compound such as lithium hydroxide is mixed with the lithium iron oxide.

The appropriate temperature for heating the mixed particles of lepidocrocite and a lithium compound so as to produce the lithium iron oxide in the present invention is 100 to 150° C. If the temperature is lower than 100° C., the ion-exchange reaction rate is so slow that the ion-exchange reaction takes a long time. If the temperature exceeds 150° C., the amount of $\alpha$-$Li_{x'}(Fe_{(1-y)}M_y)O_2$ ($0 \leq x' \leq 0.1$, $0 \leq y \leq 0.1$, M is Al, Co, Ni, Mn or the mixture thereof) having a disordered structure produced increases.

In the present invention, an unreacted lithium compound is sometimes mixed with the target lithium iron oxide depending upon the reaction conditions, as described above.

In a lithium battery using a lithium iron oxide containing an unreacted lithium compound, since the unreacted lithium compound does not show a reversible electrode reaction, the capacity of the battery is reduced and the electrochemical reversible reaction rate is lowered. It is, therefore, preferable to remove the unreacted lithium compound. In order to remove the unreacted lithium compound mixed with the lithium iron oxide, it is preferable to suspend the reaction product particles in water of as low a temperature as possible, especially, a temperature of not higher than 30° C., filtering off the precipitate and drying in as short a time as possible.

The reaction product is preferably suspended in water so that the concentration thereof is 10 to 50 wt %. This is because a lithium iron oxide having a corrugated layer structure is apt to be decomposed and to produce lepidocrocite: $\gamma$-$(Fe_{(1-A)}M_A)O(OH)$ ($0 \leq A \leq 0.1$, M is Al, Co, Ni, Mn or the mixture thereof). Accordingly, when the reaction product is suspended in water, it is preferably to suspend in water of as low a temperature as possible, especially, in cold water of a temperature of not higher than 30° C., and to filter off the precipitate in as short a time as possible, thereby suppressing the decomposition of the lithium iron oxide having a corrugated structure as much as possible.

The temperature for drying the precipitate obtained by suspending the reaction product in water and removing an unreacted lithium compound such as LiOH by washing with water is preferably as low as possible, especially, not higher than 40° C. If the temperature exceeds 40° C., the lithium iron oxide having a corrugated layer structure is apt to be decomposed and to produce lepidocrocite. The precipitate is dried under a reduced pressure, if necessary.

When the reaction product containing a lithium iron oxide containing at least one selected from the group consisting of aluminum, cobalt, nickel and manganese, obtained in the ion-exchange reaction is used to produce a lithium battery, it is preferable to wash with water, filter off the precipitate, dry the precipitate and heat-treat the dry precipitate in a temperature range of 100 to 250° C.

When the reaction product containing a lithium iron oxide containing none of aluminum, cobalt, nickel or manganese, obtained in the ion-exchange reaction is used to produce a lithium battery, it is desirable to wash with water, filter off the precipitate, dry the precipitate and heat-treat the dry precipitate in a temperature range of 100 to 250° C.

If the reaction product is not subjected to heat-treatment, the change in the crystal structure of the lithium iron oxide with time during storage may be large, and the characteristics are apt to become different among batteries depending upon the histories of the lithium iron oxides before the production of the lithium batteries. On the other hand, the heat-treatment of the reaction product provides the lithium iron oxide with an excellent storage stability, and when a lithium battery is produced therefrom, the characteristics of the battery are stabilized.

The reason why the lithium iron oxide has an excellent storage stability due to the heat-treatment is not clear, but it is considered that the residual water content, etc. has some influence.

The heat-treatment time is not specified, but it is preferably 1 to 10 hours, more preferably 1 to 5 hours from the point of view of industrial and economical advantages.

According to the present invention, by using a lithium iron oxide containing at least one element selected from the group consisting of aluminum, cobalt, nickel and manganese and having a corrugated layer structure as an active material for at least one electrode, it is possible to produce a lithium battery having improved characteristics as compared with a lithium battery using a lithium iron oxide which contains none of these elements.

Especially, when a lithium iron oxide containing a specific ratio of aluminum is used, it is possible to produce a lithium battery having a more excellent cycle life.

When a lithium iron oxide containing at least one element selected from the group consisting of cobalt, nickel and manganese used, it is possible to produce a lithium battery operatable at a large current.

It is possible to more suppress a change in the properties of a lithium iron oxide during storage and more stabilize the characteristics of a lithium battery by using a lithium iron oxide obtained by heating a mixture of lepidocrocite and a lithium compound at a temperature of 100 to 150° C., after washing the reaction product with water, filtering off and drying, heating the obtained product at 100 to 250° C.

EXAMPLES

The present invention is described in more detail by Examples and Comparative Examples, but the Examples are only illustrative and, therefore, not intended to limit the scope of the invention.

Example 1

A lithium battery was produced by using a lithium iron oxide containing aluminum and having a corrugated layer structure as an electrode active material, and the cycle life was examined.

<Synthesis of Lithium Iron Oxide>

The mixture of 24.0 g of $\gamma\text{-}(Fe_{(1-y)}Al_y)O(OH)$ particles containing 3.0 mol % of aluminum and 9.05 g of LiOH particles (anhydride) (Li/Fe=1.4) was charged into a screw-capped pressure bottle and the bottle was introduced into an electric oven which had been heated to 130° C. in advance. After one-hour of reaction, a reaction product was obtained.

The reaction product was immersed and suspended in 200 ml of cold water of a temperature of about 10° C. for 5 minutes, and washed with water. The solid precipitate was filtered out and dried at 30° C. under a reduced pressure for 3 days to obtain a lithium iron oxide containing aluminum.

<Production of Lithium Battery>

10 parts by weight of ethylene tetrafluoride as a binder and 10 parts by weight of carbon particles as a conductive material were mixed with 80 parts by weight of the obtained lithium iron oxide. 200 mg of the resultant mixture was press-molded into a current collector which was composed of a titanium mesh stamped out into a disk having a diameter of 14 mm and used as a cathode.

Metal lithium foil which was stamped out into a disk having a diameter of 14 mm was used as an anode.

As the electrolyte, lithium perchlorate ($LiClO_4$) was dissolved in a mixed solvent of propylene carbonate and dimethoxy ethane in the volume ratio of 1:1, to a concentration of 1 M.

By using the cathode, the anode, the electrolyte and a separator composed of porous polypropylene film having a thickness of 50 $\mu$m, a lithium battery having the structure shown in FIG. 1 was produced. The cathode 1 held by the titanium mesh as the current collector was disposed in the center of a stainless steel case 3, and the separator 6 was disposed on the cathode 1. The anode 4 is pressed against the inner surface of a stainless steel sealing plate 5. After pouring the electrolyte into the case 3, the case 3 is combined with the stainless steel sealing plate 5 with a gasket 7 mounted on the outer peripheral part thereof so as to produce a sealed battery.

The lithium battery obtained in this manner was subjected to a charge-and-discharge cycle test under a constant current of 1 mA and at a voltage of 1.6 to 4.1 V.

Examples 2 to 7

A lithium iron oxide was obtained in the same way as in Example 1 except for varying the aluminum content in $\gamma\text{-}(Fe_{(1-y)}Al_y)O(OH)$, the mixing ratio Li/Fe (molar ratio) of $\gamma\text{-}(Fe_{(1-y)}Al_y)O(OH)$ and a lithium compound LiOH, and the heating temperature. Table 1 shows the conditions for synthesis of a lithium iron oxide.

Table 1

|  | Al content in $\gamma$-FeO (OH) (mol %) | Li/Fe | Heating temperature (° C.) |
| --- | --- | --- | --- |
| Example 2 | 5.0 | 1.4 | 130 |
| Example 3 | 1.0 | 1.4 | 130 |
| Example 4 | 10.0 | 1.4 | 130 |
| Example 5 | 5.0 | 1.2 | 130 |
| Example 6 | 5.0 | 1.4 | 110 |
| Example 7 | 5.0 | 1.4 | 145 |

When the crystal structures of the lithium iron oxides obtained in this manner were examined by X-ray diffraction, it was found that the crystal structure of each lithium iron oxide was a corrugated layer structure similar to that of rhombic $LiMnO_2$.

A lithium battery was produced in the same way as in Example 1 by using the lithium iron oxide obtained and a charge-and-discharge cycle test was executed.

Comparative Example 1

A lithium iron oxide was produced by using $\gamma$-FeO(OH) particles containing no aluminum in place of $\gamma$-$(Fe_{(1-y)}Al_y)$O(OH) particles containing 3.0 mol % of aluminum used in Example 1.

When the crystal structure of the lithium iron oxide obtained in this manner was examined by X-ray diffraction, it was found that the lithium iron oxide also had a corrugated layer structure similar to that of rhombic $LiMnO_2$.

A lithium battery was produced in the same way as in Example 1 by using the lithium iron oxide obtained and a charge-and-discharge cycle test was executed.

Comparative Examples 2 to 5

Lithium batteries were obtained in the same way as in Example 1 except for varying the aluminum content in $\gamma$-$(Fe_{(1-y)}Al_y)$O(OH), the mixing ratio Li/Fe (molar ratio) of $\gamma$-$(Fe_{(1-y)}Al_y)$O(OH) and a lithium compound LiOH, and the heating temperature. However, in Comparative Example 2 in which the aluminum content was 15.0 mol%, lepidocrocite was not obtained only, so that the synthesis of a lithium iron oxide was not executed.

Table 2 shows the conditions for synthesis of a lithium iron oxide. Table 2 also shows the results of the identification of the reaction products by X-ray diffraction. In the corrugated '$\alpha$', '$\beta$' and '$\gamma$' in Table 2, a corrugated layer structure thereof is similar to that of rhombic $LiMnO_2$.

TABLE 2

|  | Al content in $\gamma$-FeO (OH) (mol %) | Li/Fe | Heating temperature (° C.) | Reaction product |
| --- | --- | --- | --- | --- |
| Comparative Example 3 | 5.0 | 1.4 | 80 | Corrugated, $\alpha$, $\gamma$ |
| Comparative Example 4 | 5.0 | 1.4 | 180 | Corrugated, $\alpha$ |
| Comparative Example 5 | 5.0 | 1.0 | 130 | Corrugated, $\beta$,$\gamma$ |

$\alpha$: disordered tetragonal $\alpha$-Li $(Fe_{(1-y)}Al_y)$ $O_2$
$\beta$: disordered spinel $\beta$-Li $(Fe_{1-y}Al_y)_5O_8$
$\gamma$: lepidocrocite $\gamma$- $(Fe_{(1-y)}Al_y)$ O (OH)

A lithium battery was produced in the same way as in Example 1 by using the lithium iron oxide obtained and a charge-and-discharge cycle test was executed.

Figure 2:
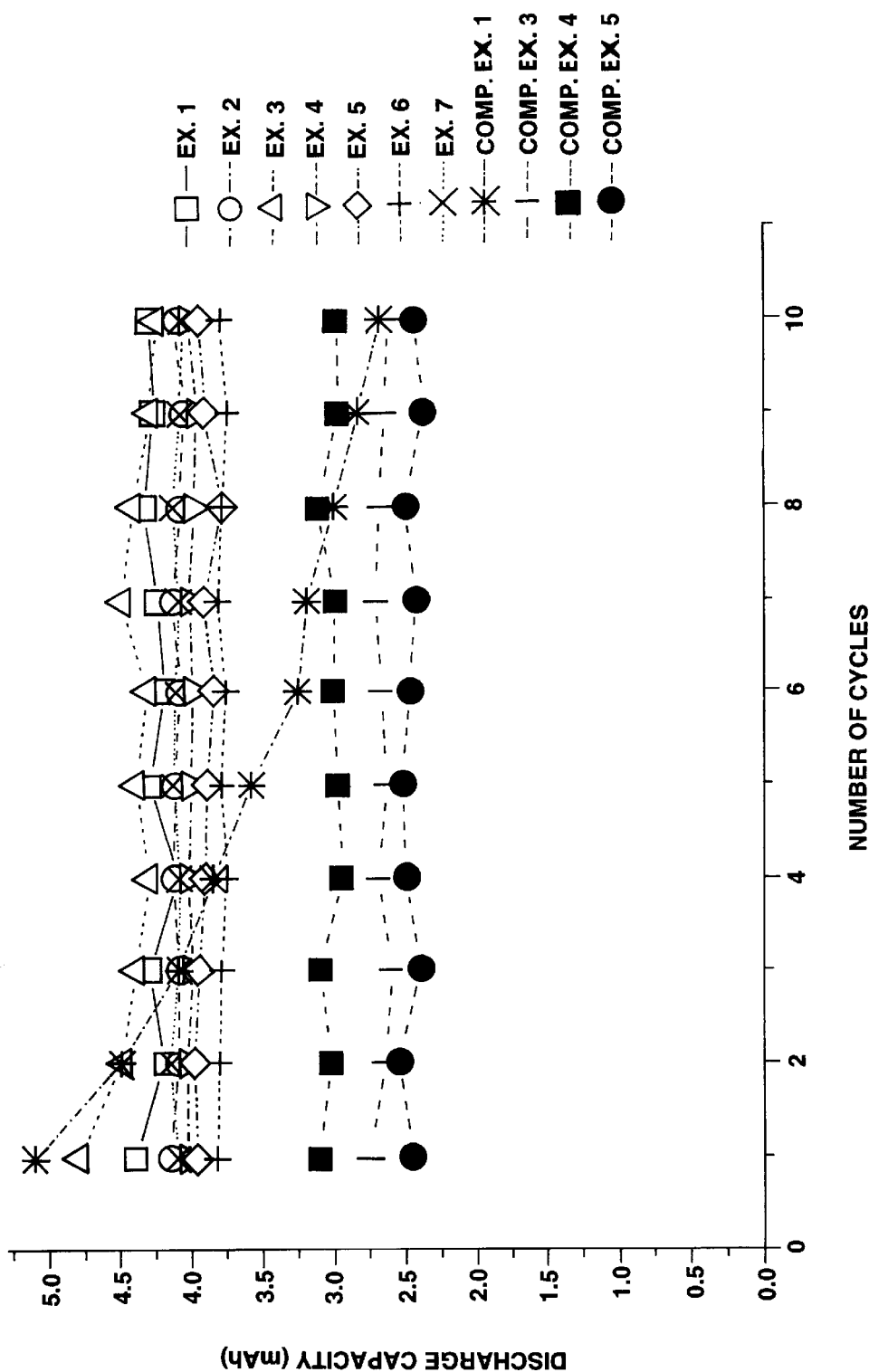
FIG. 2 shows the cycle life of lithium batteries in Examples and Comparative Examples of the present invention.

FIG. 2 shows a change in discharge capacity with charge-and-discharge cycle in the lithium battery in each of Examples 1 to 7 and Comparative Examples 1 and 3 to 5.

From FIG. 2, it is found that a reduction in the discharge capacity with charge-and-discharge cycle is smaller in the lithium batteries in Examples 1 to 7 than that in the lithium battery in Comparative Example 1 which used the lithium iron oxide containing no aluminum. In Comparative Examples 3 to 5, although a reduction in the discharge capacity is small, the discharge capacity itself is small from the early stage of the charge-and-discharge cycle.

From these examples and comparative examples, it is clear that it is possible to obtain a lithium battery having an excellent cycle life by using a lithium iron oxide containing aluminum as an electrode active material.

Example 8

A lithium battery was produced by using a lithium iron oxide containing cobalt and having a corrugated layer structure as an electrode active material, and the discharge rate characteristic was examined.

A lithium iron oxide was synthesized in the same way as in Example 1 except for using $\gamma$-$(Fe_{(1-y)}Co_y)$O(OH) particles containing 3.0 mol % of cobalt as lepidocrocite.

A lithium battery was produced in the same way as in Example 1 by using the lithium iron oxide obtained.

The lithium battery was discharged under various currents so as to examine the relationship between the discharge rate and the discharge capacity.

Examples 9 to 14

A lithium iron oxide was obtained in the same way as in Example 1 except for varying the type of lepidocrocite $\gamma$-$(Fe_{(1-y)}M_y)$O(OH) and the heating temperature. Table 1 shows the conditions for synthesis of a lithium iron oxide. The mixing ratio Li/Fe (molar ratio) of $\gamma$-$(Fe_{(1-y)}M_y)$O(OH) and a lithium compound LiOH was constantly set at 1.4. Table 3 shows the conditions for synthesis of a lithium iron oxide.

Table 3

|  | M content in $\gamma$-FeO (OH) (mol %) | Heating temperature (° C.) |
| --- | --- | --- |
| Example 9 | Co: 5.0 | 130 |
| Example 10 | Co: 1.0 | 130 |
| Example 11 | Co: 10.0 | 130 |
| Example 12 | Ni: 5.5 | 130 |
| Example 13 | Ni: 4.0 | 130 |
| Example 14 | Co: 5.0 | 110 |

When the crystal structures of the lithium iron oxides obtained in this manner were examined by X-ray diffraction, it was found that each lithium iron oxide had a corrugated layer structure similar to that of rhombic $LiMnO_2$.

A lithium battery was produced in the same way as in Example 1 by using the lithium iron oxide obtained and the lithium battery was discharged under various currents so as to examine the relationship between the discharge rate and the discharge capacity in the same way as in Example 8.

Comparative Example 6

A lithium iron oxide was produced by using lepidocrocite containing none of aluminum, cobalt, nickel, and manganese obtained in Comparative Example 1 in place of $\gamma$-$(Fe_{(1-y)}Co_y)$O(OH) particles containing 3.0 mol % of cobalt used in Example 8. A lithium battery was produced in the same way as in Example 1 by using the lithium iron oxide obtained and the lithium battery was discharged under various currents so as to examine the relationship between the discharge rate and the discharge capacity in the same way as in Example 8.

Comparative Examples 7 to 9

Lithium batteries were obtained in the same way as in Example 8 except for varying the mixing ratio Li/Fe (molar ratio) of the lepidocrocite $\gamma$-$(Fe_{(1-y)}Co_y)$O(OH) containing 5.0 mol % of cobalt and a lithium compound LiOH, and the heating temperature. Table 4 shows the conditions for synthesis of a lithium iron oxide.

Table 4 also shows the results of the identification of the reaction products by X-ray diffraction. In the corrugated 'α', 'β', and 'γ' in Table 4, a corrugated layer structure thereof is similar to that of rhombic $LiMnO_2$.

TABLE 4

Figure 3:
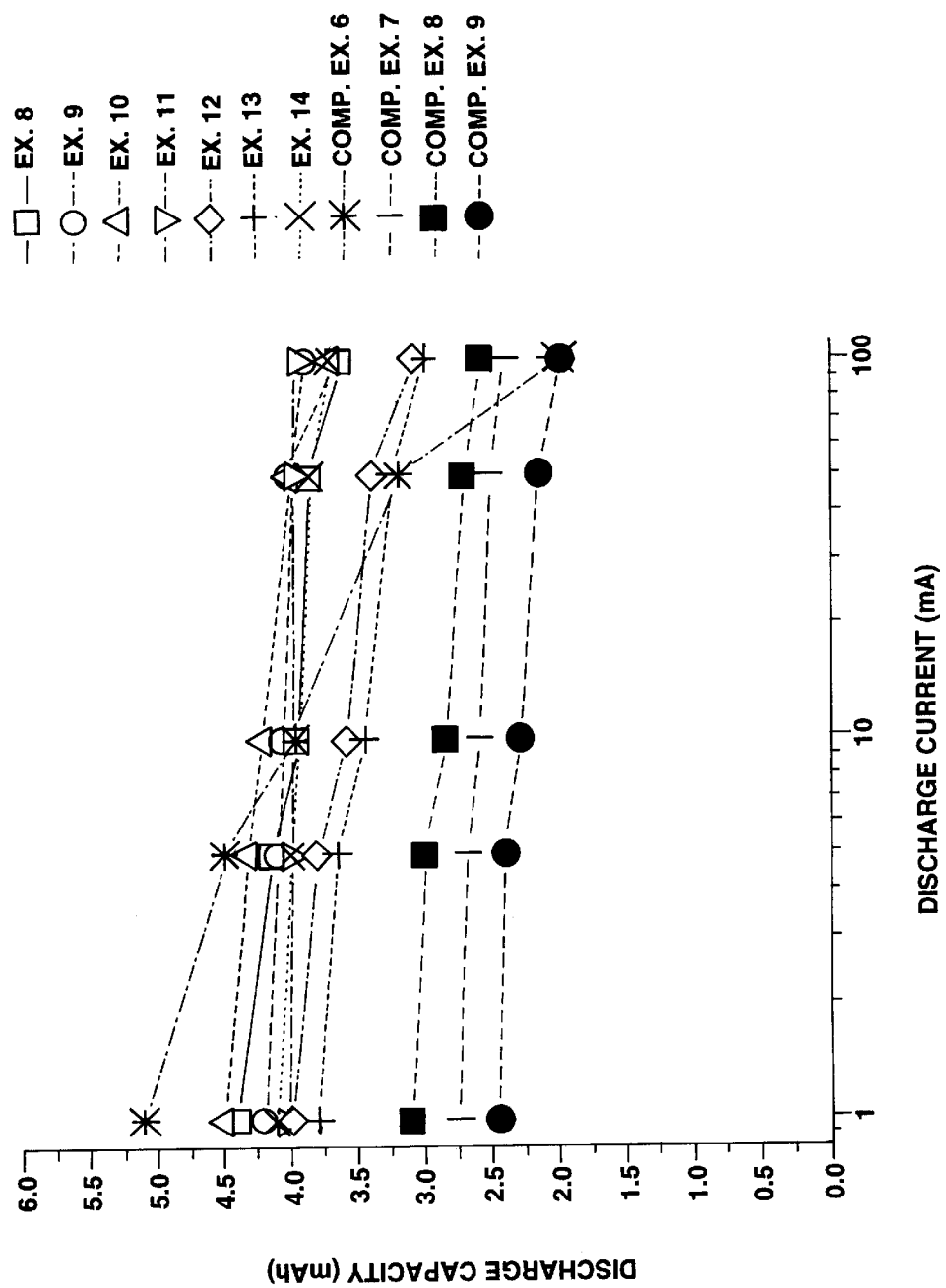
FIG. 3 shows the relationship between the discharge current and the discharge capacity in lithium batteries in Examples and Comparative Examples of the present invention.

|  | Li/Fe | Heating temperature (° C.) | Reaction product |
| --- | --- | --- | --- |
| Comparative Example 7 | 1.4 | 80 | Corrugated, α, γ |
| Comparative Example 8 | 1.4 | 180 | Corrugated, α |
| Comparative Example 9 | 1.0 | 130 | Corrugated β,γ |

α: disordered tetragonal $\alpha\text{-Li}(Fe_{(1-y)}Co_y)\,O_2$
β: disordered spinel $\beta\text{-Li}(Fe_{(1-y)}Co_y)_{.5}O_8$
γ: lepidocrocite $\gamma\text{-}(Fe_{(1-y)}Co_y)\,O\,(OH)$ FIG. 3 shows the relationship between the discharge current and the discharge capacity in the lithium battery in each of Examples 8 to 14 and Comparative Examples 6 to 9.

From FIG. 3, it is found that the discharge capacity is larger in the lithium batteries in Examples 8 to 14 than that in the lithium battery in Comparative Example 6 which used the lepidocrocite containing none of aluminum, cobalt, nickel and manganese. A reduction in the discharge current in the battery in Comparative Example 6 is remarkable especially in discharge under a large current. In Comparative Examples 7 to 9, although a reduction in the discharge capacity with an increase in the discharge current is small, the discharge capacity itself is smaller under any discharge current than that of the battery in any of Examples 8 to 14.

From these examples and comparative examples, it is clear that it is possible to obtain a lithium battery which can have a large current operated by using a lithium iron oxide containing cobalt, nickel or manganese as an electrode active material.

Example 15

A reaction product obtained by heating a mixture of lepidocrocite and a lithium compound at a temperature of 100 to 150° C., was washed with water, filtered off, dried and heated at 100 to 250° C., thereby obtaining a lithium iron oxide having a corrugated layer structure. A lithium battery was produced by using the obtained lithium iron oxide containing cobalt and having a corrugated layer structure as an electrode active material, and the cycle life was examined.

That is, the mixture of 24.0 g of γ-FeO(OH) particles and 9.05 g of LiOH particles (anhydride) (Li/Fe=1.4) was charged into a screw-capped pressure bottle and the bottle was introduced into an electric oven which had been heated to 130° C. in advance and reacted for one hour.

The reaction product was immersed and suspended in 200 ml of cold water of a temperature of about 10° C. for 5 minutes, and washed with water. The solid precipitate was filtered off and dried at 30° C. under a reduced pressure for 3 days. The reaction product obtained was identified by the following method and heated in the air at 200° C. for 5 hours, thereby obtaining a lithium iron oxide.

The lithium iron oxide obtained in this manner was stored in the air. A lithium battery was produced in the same way as in Example 1 by using the lithium iron oxide stored for a predetermined time.

The lithium battery was discharged under a constant current of 1 mA so as to examine the relationship between the storage period and the discharge capacity.

Examples 16 to 26

Various kinds of lepidocrocite $\gamma\text{-}(Fe_{(1-y)}M_y)O(OH)$ and a lithium compound LiOH were mixed so that the mixing ratio Li/Fe (molar ratio) was 1.4. The obtained mixtures were reacted at 130° C. for one hour, and the reaction products obtained were washed with water, filtered off, and dried in the same way as in Example 15. The obtained products were then heat-treated under various conditions to obtain lithium iron oxides. Table 5 shows the kinds of lepidocrocite and heat-treating conditions.

TABLE 5

|  | Lepidocrocite | Heat-treatment temperature (° C.) | Heat-treatment time (hr) |
| --- | --- | --- | --- |
| Example 16 | FeO(OH) | 150 | 5 |
| Example 17 | FeO(OH) | 100 | 5 |
| Example 18 | FeO(OH) | 200 | 1 |
| Example 19 | $Fe_{0.97}Al_{0.03}OOH$ | 200 | 5 |
| Example 20 | $Fe_{0.99}Al_{0.01}OOH$ | 200 | 5 |
| Example 21 | $Fe_{0.90}Al_{0.10}OOH$ | 200 | 5 |
| Example 22 | $Fe_{0.97}Co_{0.03}OOH$ | 200 | 5 |
| Example 23 | $Fe_{0.99}Co_{0.01}OOH$ | 200 | 5 |
| Example 24 | $Fe_{0.90}Co_{0.10}OOH$ | 200 | 5 |
| Example 25 | $Fe_{0.97}Ni_{0.03}OOH$ | 200 | 5 |
| Example 26 | $Fe_{0.97}Mn_{0.03}OOH$ | 200 | 5 |

When the crystal structures of the lithium iron oxides obtained in this manner were examined by X-ray diffraction, it was found that each lithium iron oxide had a corrugated layer structure similar to that of rhombic $LiMnO_2$.

A lithium battery was produced in the same way as in Example 15 by using the lithium iron oxide obtained in this manner. The lithium battery was discharged under a constant current of 1 mA so as to examine the relationship between the storage period and the discharge capacity.

Comparative Example 10

A lithium iron oxide was obtained in the same way as in Example 15 except for omitting the heat-treatment of the reaction product. The lithium iron oxide was stored for a predetermined time and a lithium battery was produced in the same way as in Example 1.

The lithium battery was discharged under a constant current of 1 mA so as to obtain the relationship between the storage period and the discharge capacity.

FIG. 4 shows the relationship between the discharge capacity of the lithium battery and the storage period of the lithium iron oxide in each of Examples 15 to 26 and Comparative Example 10 which was obtained from each discharge test.

As is clear from FIG. 4, almost no change in discharge capacity with storage period was observed in the lithium batteries in Examples 15 to 26. In contrast, in the lithium batteries in Comparative Example 10, a remarkable reduction in the discharge capacity with an increase in the storage period of a lithium iron oxide was observed.

As explained above, according to the present invention, it is possible to suppress a change in battery characteristics with storage period of a lithium iron oxide, and stabilize the characteristics of a lithium battery.

Example 27

A lithium battery was produced by using the lithium iron oxide containing aluminum in Example 1 as an anode active material.

10 parts by weight of ethylene tetrafluoride as a binder and 10 parts by weight of carbon particles as a conductive material were mixed with 80 parts by weight of the lithium iron oxide obtained in Example 1. 200 mg of the mixture was press-molded into a current collector which was composed of a stainless steel mesh which was stamped out into a disk having a diameter of 14 mm and used as the anode.

$LiCoO_2$ obtained in the following manner was used as the cathode active material.

$Li_2Co_3$ and $Co_3O_4$ were used as the starting material.

$Li_2Co_3$ and $Co_3O_4$ were mixed in a molar ratio of 3:2, and the resultant mixture was charged into an aluminum crucible and was calcined at 750° C. for 24 hours in a stream of oxygen, thereby obtaining $LiCoO_2$.

10 parts by weight of ethylene tetrafluoride as a binder and 10 parts by weight of carbon particles as a conductive material were mixed with 80 parts by weight of the thus-obtained $LiCoO_2$. 500 mg of the obtained mixture was press-molded into a current collector which was composed of a stainless steel mesh which stamped out into a disk having a diameter of 14 mm and used as the cathode.

A lithium battery was produced in the same way as in Example 1 except for using the cathode and the anode obtained in this manner.

As a comparison, a lithium battery was produced in the same way by using the lithium iron oxide containing no aluminum which was obtained in Comparative Example 1.

The lithium batteries obtained in this manner were subjected to a charge-and-discharge cycle test under a constant current of 1 mA and at a voltage of 0 to 2.6 V.

A reduction in the discharge capacity with charge-and-discharge cycle was not observed in the lithium batteries which used an lithium iron oxide containing aluminum. In contrast, in the battery using the lithium iron oxide containing no aluminum, a reduction in the discharge capacity with charge-and-discharge cycle was remarkable.

From these examples and comparative example, it is clear that it is possible to obtain a lithium battery having an excellent cycle life by using lithium iron oxide containing aluminum as an electrode active material.

Example 28

Lithium batteries were produced by using the lithium iron oxide containing cobalt, the lithium iron oxide containing nickel and the lithium iron oxide containing manganese obtained in Examples 8, 12 and 13, respectively, as the anode active material.

Lithium batteries were produced in the same way as in Example 27 except for using the lithium iron oxide containing cobalt, the lithium iron oxide containing nickel and the lithium iron oxide containing manganese obtained in Examples 8, 12 and 13, respectively, in place of the lithium iron oxide containing aluminum.

As a comparison, a lithium battery was produced in the same way by using the lithium iron oxide containing none of these elements which was obtained in Comparative Example 1.

After these lithium batteries were charged at a constant voltage of 2.6 V for 48 hours, they were discharged under various currents so as to examine the discharge capacity.

A reduction in the discharge capacity with an increase in the discharge current was remarkable in the lithium battery which used the lithium iron oxide containing none of cobalt, nickel and manganese as compared with that in the lithium battery which used a lithium iron oxide containing cobalt, nickel or manganese.

From these examples and comparative example, it is clear that it is possible to obtain a lithium battery which can have a large current operated by using a lithium iron oxide containing cobalt, nickel or manganese as an electrode active material.

Example 29

Lithium batteries were produced by using the lithium iron oxide which was synthesized and heat-treated in Example 15 as the anode active material.

Lithium batteries were produced in the same way as in Example 27 except for using the lithium iron oxide which was synthesized and heat-treated in Example 15 and which was stored in the air for various periods in place of the lithium iron oxide containing aluminum.

As a comparison, lithium batteries were produced by using lithium iron oxide which omitted the heat-treatment step, that is, was obtained in Comparative Example 1.

After these lithium batteries were charged at a constant voltage of 2.6 V for 48 hours, they were discharged under various currents so as to examine the discharge capacity.

In a lithium battery using a lithium iron oxide which was not subjected to heat-treatment, a remarkable reduction in the discharge capacity with an increase in the storage period of a lithium iron oxide in the air was observed as compared with that in a lithium battery using a lithium iron oxide subjected to heat-treatment.

As explained above, according to the present invention, it is possible to suppress a change in battery characteristics with storage period of a lithium iron oxide, and stabilize the characteristics of a lithium battery.

Example 30

An all-solid lithium battery was produced by using the lithium iron oxide obtained in Example 1 and a sulfide lithium ion conductive amorphous solid electrolyte represented by $0.6Li_2S$—$0.4SiS_2$ as the electrolyte, and the characteristics of the battery was determined.

The sulfide lithium ion conductive solid electrolyte $0.6Li_2S$—$0.4SiS_2$ was synthesized in the following manner.

Lithium sulfide ($LiS_2$) and silicon sulfide ($SiS_2$) were mixed in the molar ratio of 3:2, and the obtained mixture was charged into a glassy carbon crucible. The crucible was introduced into a vertical oven and heated at 950° C. in a stream of argon so as to melt the mixture. After heating the mixture for 2 hours, the crucible was dropped into liquid nitrogen so as to quench the mixture, thereby obtaining a lithium ion conductive amorphous solid electrolyte represented by $0.6Li_2S$—$0.4SiS_2$.

The thus-obtained lithium ion conductive amorphous solid electrolyte was pulverized and mixed with the lithium iron oxide synthesized in Example 1 in the weight ratio of 1:1. 10 parts by weight of carbon particles were mixed 90 parts by weight of the mixture as a material for the cathode.

An indium-lithium alloy produced by press bonding metal lithium foil to metal indium having a thickness of 0.1 mm which was stamped out into a disk having a diameter of 10 mm was used as the anode.

200 mg of the material for the cathode and the indium-lithium alloy for the anode which were obtained in the above-described manner were integrally molded into a disk having a diameter of 10 mm with the solid electrolyte therebetween and an all-solid lithium battery element was obtained. The all-solid lithium battery element was introduced into a stainless steel case and sealed with a sealing sheet via a gasket, thereby producing an all-solid lithium battery.

As a comparison, an all-solid lithium battery was produced in the same way by using the lithium iron oxide containing no aluminum which was obtained in Comparative Example 1.

The all-solid lithium batteries obtained in this manner were subjected to a charge-and-discharge cycle test under a constant current of 100 $\mu$A and at a voltage of 1.0 to 3.4 V.

A reduction in the discharge capacity with charge-and-discharge cycle was not observed in the all-solid lithium battery which used the lithium iron oxide containing aluminum. In contrast, in the battery using the lithium iron oxide containing no aluminum, a reduction in the discharge capacity with charge-and-discharge cycle was remarkable.

From these example and comparative example, it is clear that it is possible to obtain an all-solid lithium battery having an excellent cycle life by using a lithium iron oxide containing aluminum as an electrode active material.

Example 31

All-solid lithium batteries were produced by using the lithium iron oxide containing cobalt, the lithium iron oxide containing nickel and the lithium iron oxide containing manganese obtained in Examples 8, 12 and 13, respectively.

All-solid lithium batteries were produced in the same way as in Example 30 except for using lithium iron oxide containing cobalt, the lithium iron oxide containing nickel and the lithium iron oxide containing manganese obtained in Examples 8, 12 and 13, respectively, in place of the lithium iron oxide containing aluminum.

As a comparison, an all-solid lithium battery was produced in the same way by using the lithium iron oxide containing none of these elements which was obtained in Comparative Example 1.

After these lithium batteries were charged at a constant voltage of 3.5 V for 48 hours, they were discharged under various currents so as to examine the discharge capacity.

A reduction in the discharge capacity with an increase in the discharge current was remarkable in the lithium battery which used the lithium iron oxide containing none of cobalt, nickel and manganese as compared with that in the lithium battery which used a lithium iron oxide containing cobalt, nickel or manganese.

From these examples and comparative example, it is clear that it is possible to obtain an all-solid lithium battery which can operate a large current by using a lithium iron oxide containing cobalt, nickel or manganese as an electrode active material.

Example 32

All-solid lithium batteries were produced by using the lithium iron oxide which was synthesized and heat-treated in Example 15.

All-solid lithium batteries were produced in the same way as in Example 30 except for using the lithium iron oxide which was synthesized and heat-treated in Example 15, and which was stored in the air for various periods in place of the lithium iron oxide containing aluminum.

As a comparison, all-solid lithium batteries were produced by using lithium iron oxide which omitted the heat-treatment step, that is, was obtained in Comparative Example 1.

After these lithium batteries were charged at a constant voltage of 3.5 V for 48 hours, they were discharged under various currents so as to examine the discharge capacity.

In an all-solid lithium battery using a lithium iron oxide which was not subjected to heat-treatment, a remarkable reduction in the discharge capacity with an increase in the storage period of a lithium iron oxide in the air was observed as compared with that in an all-solid lithium battery using a lithium iron oxide subjected to heat-treatment.

As explained above, according to the present invention, it is possible to suppress a change in battery characteristics with storage period of a lithium iron oxide, and stabilize the characteristics of an all-solid lithium battery.

In the examples, a lithium iron oxide obtained by replacing a part of iron in $\gamma$-FeO(OH) by a single element such as $LiFe_{0.97}Al_{0.03}O_2$ and $LiFe_{0.97}Co_{0.03}O_2$ was used, but it was also confirmed that similar effects were produced from a lithium iron oxide obtained by replacing a part of iron in $\gamma$-FeO(OH) by plural elements selected from the above-described elements such as $LiFe_{0.90}Co_{0.05}Ni_{0.05}O_2$ and $LiFe_{0.90}Co_{0.05}Al_{0.05}O_2$. That is, a lithium iron oxide in the present invention is not restricted to those obtained by replacing a part of iron in $\gamma$-FeO(OH) by a single element.

In the examples, when a lithium iron oxide was used as the cathode active material, metal lithium or an indium-lithium alloy was used as the anode active material, but it was also confirmed that similar effects were produced from a lithium battery using another lithium alloy such as Li—Al or graphite as the anode active material. That is, the lithium battery of the present invention is not restricted to those using the anode active material shown in the examples.

In the examples, when a lithium iron oxide was used as the anode active material, $LiCoO_2$ was used as active material for the cathode active material, but it was also confirmed that similar effects were produced from a lithium battery using another material such as $LiNiO_2$ and $LiMn_2O_4$ as the cathode active material. That is, the lithium battery of the present invention is not restricted to those using the cathode active material shown in the examples.

The lithium batteries in the examples used lithium perchlorate dissolved in a mixed solvent of propylene carbonate and dimethoxy ethane, or a sulfide lithium ion conductive amorphous solid electrolyte represented by $0.6Li_2S$—$0.4SiS_2$ as the electrolyte. It was also confirmed that it is possible to use another electrolyte such as a liquid containing $LiPF_6$ as a supporting electrolyte, an electrolyte using ethylene carbonate as the solvent, and a solid electrolyte such as $Li_3PO_4$—$Li_2S$—$SiS_2$, $LiI$—$Li_2S$—$B_2S_3$, $Li_2S$—$P_2S_5$ and $LiI$—$Al_2O_3$. That is, the lithium battery of the present invention is not restricted to those using the electrolytes described in the examples.

In addition, although LiOH was used as the starting material in the examples, it was also confirmed that similar effects were produced from a lithium battery using another lithium compound such as $LiOH.H_2O$, LiOH, $Li_2O$ $Li_2O_2$ and $Li_2O_3$ or a mixture containing at least one of them. That is, the lithium battery of the present invention is not restricted to those using the lithium compound described in the examples.

What is claimed is:

1. A lithium battery comprising a pair of electrodes disposed by means of a separator in the presence of a lithium ion conductive electrolyte, wherein at least one of said electrodes comprises lithium iron oxide having a corrugated layer structure when examined by x-ray diffraction, the lithium iron oxide doped with at least one additional metal and produced by heating a mixture of lepidocrocite and a lithium compound at a temperature of 100 to 150° C., and after washing the reaction product with water, filtering off and drying, heat-treating the obtained product at a temperature of 100 to 250° C.

2. A lithium battery comprising a pair of electrodes disposed by means of a separator in the presence of a lithium ion conductive electrolyte, wherein at least one of said electrodes comprises lithium iron oxide which has a corrugated layer crystal structure when examined by x-ray diffraction, which lithium iron oxide is represented by the formula (1):

$$Li_x(Fe_{(1-y)}M_y)O_2 \qquad (1):$$

wherein M represents at least one element selected from the group consisting of cobalt, nickel, manganese and aluminum, x is more than 0 and less than 2, and y is 0.005 to 0.1, and which is produced by heating a mixture of lepidocrocite containing at least one element selected from the group consisting of cobalt, nickel, manganese and aluminum and a lithium compound at a temperature of 100 to 150° C., wherein the mixing ratio (Li/Fe) of lepidocrocite and the lithium compound is not less than 1.2.

3. The lithium battery according to claim 2 wherein M is aluminum.

4. The lithium battery according to claim 2, wherein said lithium iron oxide has an average particle diameter of 0.01 to 1.0 μm.

5. A lithium battery according to claim 2, wherein said lithium iron oxide is produced after heating the mixture of lepidocrocite and the lithium compound, by washing the reaction product with water by suspending the reaction product particles in water of a temperature of not more than 30° C., filtering off, drying at a temperature of not more than 40° C., and heat-treating the obtained product at a temperature of 100 to 250° C.

* * * * *